United States Patent
Omura et al.

(10) Patent No.: US 6,417,310 B1
(45) Date of Patent: Jul. 9, 2002

(54) METHOD FOR PREPARING BRANCHED ORGANOPOLYSILOXANE

(75) Inventors: Naoki Omura, Usui-gun; Satoshi Kuwata, Chiyoda-ku; Yoshihito Osawa, Usui-gun, all of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 47 days.

(21) Appl. No.: 09/659,560

(22) Filed: Sep. 11, 2000

(30) Foreign Application Priority Data

Sep. 9, 1999 (JP) .......................................... 11-256024
Sep. 29, 1999 (JP) .......................................... 11-276501

(51) Int. Cl.$^7$ .............................................. C08G 77/08
(52) U.S. Cl. ........................... 528/39; 528/12; 528/21; 528/23; 528/14; 556/455; 556/462
(58) Field of Search ............................... 528/39, 14, 21, 528/23, 12; 556/455, 462

(56) References Cited

U.S. PATENT DOCUMENTS

| 5,376,301 A | 12/1994 | Fleuren et al. |
| 5,429,771 A | 7/1995 | Fleuren et al. |

FOREIGN PATENT DOCUMENTS

| JP | 56-38609 | 9/1981 |
| JP | 60-22018 | 5/1985 |
| JP | 63-286434 | 11/1988 |
| JP | 4-178429 | 6/1992 |
| JP | 4-198321 | 7/1992 |
| JP | 5-271689 | 10/1993 |
| JP | 8-85760 | 4/1996 |
| JP | 8-196811 | 8/1996 |
| JP | 8-309104 | 11/1996 |
| JP | 10-60115 | 3/1998 |
| JP | 11-71522 | 3/1999 |

OTHER PUBLICATIONS

English abstract of 8–196811.
English abstract of 8–309104.
English abstract of 8–085760.
English abstract of 10–60115.
English abstract of 58–101153.
English abstract of 54–131661.
English abstract of 63–286434.
English abstract of 4–178429.
English abstract of 4–198321.
English abstrac of 4–11–71522.

Primary Examiner—Margaret G. Moore
(74) Attorney, Agent, or Firm—Millen, White, Zelano & Branigan, P.C.

(57) ABSTRACT

A branched organopolysiloxane is prepared by polymerizing an organopolysiloxane mixture of a branch unit-containing organopolysiloxane and a low molecular weight organopolysiloxane in the presence of an acidic or basic catalyst, or by adding a surfactant to the organopolysiloxane mixture, dispersing it in water to form an emulsion, and polymerizing the emulsion.

20 Claims, No Drawings

METHOD FOR PREPARING BRANCHED ORGANOPOLYSILOXANE

BACKGROUND OF THE INVENTION

As is well known in the art, branched organopolysiloxanes are improved in low-temperature properties and thixotropy over linear organopolysiloxanes. Recently, the branched organopolysiloxanes are considered useful as antifoaming agents (see JP-A 5-271689, 8-196811 and 8-309104) and aqueous coating agents (see JP-B 60-22018 and JP-A 8-85760). However, it was difficult to introduce branched structure units into organopolysiloxane units. Although JP-A 10-60115 discloses a method for preparing branched organopolysiloxane, a further improvement in productivity is desired.

As to the preparation of branched organopolysiloxane emulsions, emulsion polymerization of a cyclic siloxane and a trialkoxysilane is disclosed in JP-B 56-38609 and JP-A 63-286434. Since this method is equilibration reaction using an acidic or basic catalyst, the resulting siloxane product generally contains about 8 to 15% by weight, most often about 12% by weight of volatile low molecular weight siloxanes.

There were developed methods for preparing an organopolysiloxane emulsion such that the content of volatile low molecular weight siloxanes is reduced. For example, JP-A 4-178429 discloses polymerizing an emulsion containing a both end hydroxy-blocked organopolysiloxane and a catalyst at a temperature below 40° C. In JP-A 4-198321, a both end hydroxy-blocked organopolysiloxane and a both end aminoxy-blocked organopolysiloxane are emulsion polymerized. Emulsion polymerization of a both end hydroxy-blocked organopolysiloxane in the presence of a sulfonic acid is disclosed in JP-A 11-71522. In these patents, no reference is made to the preparation of a branched organopolysiloxane emulsion.

SUMMARY OF THE INVENTION

An object of the invention is to provide an efficient method for preparing branched organopolysiloxane.

Another object of the invention is to provide an method for preparing a branched organopolysiloxane emulsion having a minimized content of low molecular weight siloxanes and suited as a base of a fiber treating agent and coating agent.

We have found that a branched organopolysiloxane can be prepared in an efficient manner by polymerizing an organopolysiloxane mixture of an organopolysiloxane containing branch units of a specific structure and a low molecular weight organopolysiloxane in the presence of an acidic or basic catalyst, or by adding a surfactant to such an organopolysiloxane mixture, dispersing it in water to form an emulsion, and polymerizing the emulsion in the presence of an acidic or basic catalyst.

According to a first aspect, the invention in one embodiment provides a method for preparing a branched organopolysiloxane, comprising the step of polymerizing an organopolysiloxane mixture comprising (A) a branched organopolysiloxane of the following general formula (1) and (B) a low molecular weight organopolysiloxane in the presence of an acidic or basic catalyst. In another embodiment, the method involves the steps of adding (C) an acidic or basic surfactant to an organopolysiloxane mixture of components (A) and (B) and dispersing the organopolysiloxane mixture in water with the aid of the surfactant to form an emulsion, and polymerizing the organopolysiloxane mixture in the emulsion.

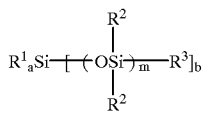

(1)

Herein $R^1$ is a monovalent organic group of 1 to 20 carbon atoms, $R^2$ is independently a monovalent organic group of 1 to 20 carbon atoms, $R^3$ is a hydroxyl group, alkoxy group of 1 to 6 carbon atoms or monovalent organic group of 1 to 20 carbon atoms, m is a number from 1 to 100, "a" is equal to 0 or 1, "b" is equal to 3 or 4, and a+b is equal to 4.

We also attempted to prepare a branched organopolysiloxane emulsion having a minimized content of volatile low molecular weight siloxanes. We have found that by polycondensing a hydroxy-terminated branch unit-bearing organopolysiloxane and a hydroxy-terminated diorganopolysiloxane, both containing up to 5% by weight of cyclic low molecular weight siloxanes having up to 10 silicon atoms, in water in the presence of an acidic or basic catalyst and a surfactant, there is obtained a branched organopolysiloxane emulsion containing up to 5% by weight of cyclic low molecular weight siloxanes having up to 10 silicon atoms. This emulsion causes less environmental pollution because of the minimized volatilization of low molecular weight siloxanes and is thus suited as a fiber treating agent and coating agent.

According to a second aspect, the invention in one embodiment provides a method for preparing a branched organopolysiloxane, comprising the step of polymerizing an organopolysiloxane mixture in the presence of an acidic or basic catalyst. The organopolysiloxane mixture contains (D) a branched organopolysiloxane of the following general formula (2):

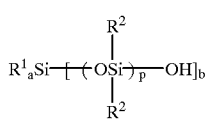

(2)

wherein $R^1$ is a monovalent organic group of 1 to 20 carbon atoms, $R^2$ is independently a monovalent organic group of 1 to 20 carbon atoms, p is an integer of 4 to 100, "a" is equal to 0 or 1, "b" is equal to 3 or 4, and a+b is equal to 4, the organopolysiloxane containing up to 5% by weight of cyclic low molecular weight siloxanes having up to 10 silicon atoms, and (E) a hydroxy-terminated organopolysiloxane of the following general formula (3):

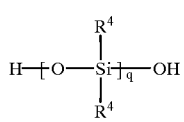

(3)

wherein $R^4$ is a monovalent organic group of 1 to 20 carbon atoms, and q is an integer of 10 to 700, the organopolysiloxane containing up to 5% by weight of cyclic low molecular weight siloxanes having up to 10 silicon atoms. In another embodiment, the method involves the steps of adding (C) an acidic or basic surfactant to an organopolysiloxane mixture of components (D) and (E) and dispersing the organopolysiloxane mixture in water with the aid of the surfactant to form an emulsion, and polymerizing the organopolysiloxane mixture in the emulsion. The resulting branched organopolysiloxane contains up to 5% by weight of cyclic low molecular weight siloxanes having up to 10 silicon atoms.

DESCRIPTION OF THE PREFERRED EMBODIMENT

The method for preparing a branched organopolysiloxane according to the first aspect of the invention uses components (A) and (B) and optionally component (C), to be defined below.

Component (A)

One starting reactant (A) used herein is an organopolysiloxane containing branch structure units, represented by the following general formula (1).

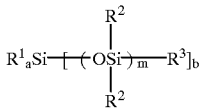
(1)

Herein $R^1$ is a monovalent organic group of 1 to 20 carbon atoms, $R^2$ which may be the same or different is a monovalent organic group of 1 to 20 carbon atoms, $R^3$ is a hydroxyl group, alkoxy group of 1 to 6 carbon atoms or monovalent organic group of 1 to 20 carbon atoms, and m is a number from 1 to 100.

The monovalent organic groups represented by $R^1$ include alkyl groups such as methyl, ethyl, propyl, butyl, pentyl, hexyl, heptyl, octyl, nonyl, decyl, dodecyl, tetradecyl, hexadecyl, octadecyl, and eicosyl, cycloalkyl groups such as cyclopentyl and cyclohexyl, alkenyl groups such as vinyl and allyl, aryl groups such as phenyl, tolyl, and naphthyl, alkoxy groups such as methoxy, ethoxy, propoxy, butoxy, hexyloxy, heptyloxy, octyloxy, decyloxy, and tetradecyloxy, and substituted ones in which some of the hydrogen atoms in these organic group structures are replaced by halogen atoms or organic groups containing a polar group such as amino, acryloxy, methacryloxy, epoxy, mercapto or carboxyl. Of these, methyl, vinyl and phenyl are especially preferred.

$R^2$ stands for one or more monovalent organic groups selected from the same monovalent organic groups as $R^1$. It is preferred that methyl account for at least 90 mol % of the $R^2$ groups.

$R^3$ stands for hydroxyl groups, alkoxy groups such as methoxy, ethoxy, propoxy, butoxy, pentoxy and hexoxy, and the same monovalent organic groups as $R^1$. Of these, hydroxyl groups are especially preferred.

Letter m having a value of less than 1 leads to a lower polymerization rate. If m has a value in excess of 100, the amount of component (A) formulated must be increased, inviting inefficiency. For this reason, m is a number from 1 to 100 on the average, and preferably 10 to 50 on the average. The letter "a" is equal to 0 or 1, "b" is equal to 3 or 4, and a+b=4.

It is not critical how to prepare component (A). For example, component (A) can be readily prepared by effecting dehydrochlorination reaction between a chlorosilane compound of the following general formula (4) or (5) and a hydroxyl-containing organopolysiloxane of the following general formula (6).

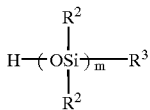
(6)

Herein $R^1$, $R^2$, $R^3$ and m are as defined above.

Component (B)

Another starting reactant (B) used herein is a low molecular weight organopolysiloxane. The low molecular weight organopolysiloxane used herein, though not critical, is preferably selected from a cyclic organopolysiloxane, a chain organopolysiloxane end-blocked with a triorganosilyl, diorganomonohydroxysilyl or diorganomonoalkoxysilyl group, and a mixture thereof.

The cyclic organopolysiloxane is preferably represented by the following general formula (7).

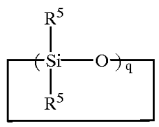
(7)

Herein, $R^5$ is hydrogen or a monovalent hydrocarbon group of 1 to 8 carbon atoms, and q is an integer of 3 to 8. Examples of the monovalent hydrocarbon group represented by $R^5$ include alkyl groups such as methyl, ethyl, propyl, butyl, hexyl and octyl, cycloalkyl groups such as cyclohexyl, alkenyl groups such as vinyl and allyl, aryl groups such as phenyl, aralkyl groups such as benzyl, and substituted ones of these groups in which some or all of the hydrogen atoms are replaced by halogen atoms such as chlorine and fluorine. The $R^5$ groups may be the same or different.

Illustrative examples of such cyclic organopolysiloxanes include hexamethylcyclotrisiloxane, octamethylcyclotetrasiloxane, decamethylcyclopentasiloxane, 1,1-diethylhexamethylcyclotetrasiloxane, phenylheptamethylcyclotetrasiloxane, 1,1-diphenylhexamethylcyclotetrasiloxane, 1,2,3,4-tetravinyl-1,2,3,4-tetramethylcyclotetrasiloxane, 1,2,3,4-tetramethylcyclotetrasiloxane, and 1,2,3,4-tetramethyl-1,2,3,4-tetraphenylcyclotetrasiloxane.

The chain organopolysiloxane having an end-blocking group is preferably represented by the following general formula (8).

(8)

Herein $R^5$ is as defined above, $R^6$ is a hydroxyl group, alkoxy group of 1 to 8 carbon atoms or $R^5$, and r is a number of 0 to 40.

Illustrative examples of such chain organopolysiloxanes include hexamethyldisiloxane, octamethyltrisiloxane, decamethyltetrasiloxane, hexadecamethylheptasiloxane, hexaethyldisiloxane, tetramethyldiethyldisiloxane, tetramethyldivinyldisiloxane, tetramethyldihydroxydisiloxane, tetramethyldimethoxydisiloxane, octamethyldihydroxytetrasiloxane, and octamethyldimethoxytetrasiloxane.

In one embodiment of the invention, an acidic or basic catalyst is added to and blended with an organopolysiloxane mixture of the above-described components (A) and (B) whereupon polymerization is effected usually at a temperature of 10 to 200° C., followed by neutralization. The acidic or basic catalyst may be selected from well-known ones. Illustratively, the acidic catalysts include inorganic acids such as sulfuric acid, phosphoric acid, hydrochloric acid and nitric acid, and organic acids such as methanesulfonic acid, trifluoromethanesulfonic acid and p-toluenesulfonic acid. The basic catalysts include inorganic alkali compounds such as potassium hydroxide, sodium hydroxide, and cesium hydroxide, organic alkali compounds such as tetrabutylammonium hydroxide and tetrabutylphosphonium hydroxide, and silanolates thereof.

In the organopolysiloxane mixture of components (A) and (B), the content of component (A) is preferably 0.1 to 50% by weight because less than 0.1% of component (A) may retard the polymerization rate and more than 50% of component (A) may result in a branched organopolysiloxane having too high a viscosity. The more preferred content of component (A) is 1 to 20% by weight.

In the above reaction using an acidic catalyst, the amount of the acidic catalyst used is preferably 0.1 to 10 molt, and more preferably 0.2 to 5 molt based on the siloxanes although the exact amount depends on the strength of the acidic catalyst and the degree of polymerization of siloxanes. As to reaction conditions, the temperature is preferably from room temperature to about 70° C. and the time is usually about 3 to 8 hours. For reaction assisted by a basic catalyst, the amount of the basic catalyst used is preferably 0.001 to 1.0 molt, and more preferably 0.01 to 0.1 mol % based on the siloxanes although the exact amount depends on the strength of the basic catalyst and the degree of polymerization of siloxanes. As to reaction conditions, the temperature is preferably from about 70 to 150° C. and the time is usually about 3 to 8 hours. In either case, reaction is carried out without a solvent. Where the reaction system is highly viscous or where it is desired to improve the activity of the catalyst, a solvent such as toluene, xylene, acetone or THF may be used.

In the other embodiment of the invention, a surfactant (C) is added to and blended with the organopolysiloxane mixture of components (A) and (B). The blend is dispersed and emulsified in water to form an emulsion. Emulsion polymerization is effected in the presence of an acidic or basic catalyst at 10 to 80° C., followed by neutralization. This yields a branched organopolysiloxane emulsion polymer.

Component (C)

Component (C) is a surfactant. An acidic or basic surfactant which serves as an emulsifier and polymerization catalyst (acidic or basic catalyst) for the organopolysiloxane mixture of components (A) and (B) may be used. Accordingly, the addition of a polymerization catalyst (acidic or basic catalyst) is not always required when the acidic or basic surfactant is used. A surfactant which does not serve as a polymerization catalyst, for example, a nonionic surfactant (nonionic emulsifier) may be used in combination with the acidic or basic surfactant for stabilizing the emulsion.

The acidic surfactants which serve as an emulsifier and polymerization catalyst are exemplified by those of the following general formulae (9) to (12), though not limited thereto.

$$R^7C_6H_4SO_3H \tag{9}$$

$$R^7C_6H_4O-(CH_2CH_2O)_s-SO_3H \tag{10}$$

$$R^8OSO_3H \tag{11}$$

$$R^8O-(CH_2CH_2O)_t-SO_3H \tag{12}$$

Herein, $R^7$ and $R^8$ each are a monovalent aliphatic hydrocarbon group having at least 6 carbon atoms, s and t each are an integer of 1 to 20.

More particularly, $R^7$ and $R^8$ in formulae (9) to (12) stand for monovalent aliphatic hydrocarbon groups having at least 6 carbon atoms, preferably 6 to 18 carbon atoms, for example, hexyl, octyl, decyl, cetyl, stearyl, myristyl, oleyl, nonenyl, octynyl, phytyl, and pentadecadienyl. Illustrative examples of such acidic surfactants include hexylbenzenesulfonic acid, octylbenzenesulfonic acid, dodecylbenzenesulfonic acid, cetylbenzenesulfonic acid, octyl sulfate, lauryl sulfate, oleyl sulfate, cetyl sulfate, polyoxyethylene nonyl phenyl sulfate, polyoxyethylene dodecyl phenyl ether sulfate, polyoxyethylene lauryl sulfate, polyoxyethylene oleyl sulfate, and polyoxyethylene cetyl sulfate.

An anionic surfactant having a weak catalysis may also be used in combination with the above acidic surfactant. Such anionic surfactants are sodium, potassium and ammonium salts of compounds of the above formulae (9) to (12). Besides, polyoxyethylene lauryl ether carboxylic acid, polyoxyethylene stearyl ether carboxylic acid, polyoxyethylene octyl ether carboxylic acid, and sodium, potassium and ammonium salts thereof or the like may also be used in combination with the above acidic surfactant.

It is also possible to use the above acidic surfactant in combination with an inorganic acid such as hydrochloric acid, sulfuric acid or phosphoric acid. After the organopolysiloxane mixture is dispersed and emulsified in water with the aid of the acidic surfactant, polymerization is effected preferably at 10 to 80° C. A temperature below 10° C. may retard the polymerization rate whereas above 80° C., the emulsion may become unstable during polymerization. The polymerization time is usually about 1 to 50 hours, preferably about 5 to 30 hours. During polymerization, the emulsion may be kept static or mildly stirred at 1 to 100 rpm. After the completion of polymerization reaction, an alkaline substance is added to the emulsion for neutralization at pH 4 to 9. Below pH 4 or above pH 9, the emulsion may lose stability. Therefore, the emulsion should preferably be kept at pH 4 to 9, and more preferably at pH 5 to 8. Examples of the alkaline substance include inorganic alkaline compounds such as alkali metal hydroxides, alkaline earth metal hydroxides, alkali metal carbonates, and alkaline earth metal carbonates, and organic alkaline compounds such as ammonia and organic amines.

It is noted that any well-known emulsifier may be used in the initial stage of dispersing and emulsifying components (A) to (C) in water. Exemplary emulsifiers are homogenizer, Microfluidizer®, Nanomizer®, colloidal mill, homomixer, Agi-homomixer®, and Combi-mixer®.

The basic surfactants which serve as an emulsifier and polymerization catalyst are exemplified by those of the following general formula (13), though not limited thereto.

$$R^9R^{10}R^{11}R^{12}NOH \tag{13}$$

Herein $R^9$ is a monovalent aliphatic hydrocarbon group of at least 6 carbon atoms, and $R^{10}$ to $R^{12}$ each are a monovalent hydrocarbon group of 1 to 8 carbon atoms.

More particularly, $R^9$ stands for monovalent aliphatic hydrocarbon groups having at least 6 carbon atoms, preferably 6 to 18 carbon atoms, for example, hexyl, octyl, decyl, cetyl, stearyl, myristyl, oleyl, nonenyl, octynyl, phytyl, and pentadecadienyl. $R^{10}$ to $R^{12}$ stand for monovalent hydrocarbon groups of 1 to 8 carbon atoms such as methyl, ethyl, propyl, butyl, pentyl, hexyl, phenyl and benzyl.

Illustrative examples of such basic surfactants include decyltrimethylammonium hydroxide, lauryltrimethylammonium hydroxide, cetyltrimethylammonium hydroxide, stearyltrimethylammonium hydroxide and benzyldimethyldodecylammonium hydroxide.

A cationic surfactant having a weak catalysis may also be used in combination with the above basic surfactant. Such cationic surfactants include hydrochloride salts, hydrobromide salts, sulfuric acid salts, and phosphoric acid salts of the compounds of formula (13), other alkylamine salts, polyamines, aminoalcohols, amine salts, pyridinium salts and imidazolium salts of fatty acid derivatives.

It is also possible to use the above basic surfactant in combination with inorganic alkaline compounds such as alkali metal hydroxides, alkaline earth metal hydroxide, alkali metal carbonates and alkaline earth metal carbonates, ammonia, and organic alkaline compounds such as organic amines.

As to dispersion, emulsification and polymerization, operation can be carried out in the same manner as in the above embodiment using an acidic surfactant as component (C). For neutralization, an acidic substance is added to adjust the emulsion preferably at pH 4 to 9, more preferably pH 5 to 8. Examples of the acidic substance used herein include inorganic acids such as hydrochloric acid, hydrobromic acid, sulfuric acid, and phosphoric acid and organic acids such as formic acid, acetic acid, lactic acid, propionic acid, malonic acid, and citric acid.

In the present invention, the anionic surfactant having a weak catalysis or the cationic surfactant having a weak catalysis may be used as component (C). In the former case, the acid is added as a polymerization catalyst. In the latter case, the alkali substance is added as a polymerization catalyst.

A nonionic surfactant (nonionic emulsifier) is also used in combination. In this case, the nonionic surfactant is added so that the catalytic action of the acidic or basic surfactant is not injured.

Nonionic surfactants having a HLB of 6 to 20 are preferably used, although not limited thereto. Examples of the nonionic surfactants include polyoxyethylene (6) sorbitan monolaurate, polyoxyethylene (20) sorbitan monopalmitate, polyoxyethylene (20) sorbitan monostearate, polyoxyethylene (20) sorbitan trioleate, polyoxyethylene (6) lauryl ether, polyoxyethylene (7) cetyl ether, polyoxyethylene (12) stearyl ether, polyoxyethylene (9) octylphenyl ether, polyoxyethylene (11) nonylphenyl ether, polyethyleneglycol (14) monostearate, polyethyleneglycol (80) distearate, and polyoxyethylene (25) hydrogenated caster oil.

As to dispersion, emulsification and polymerization using the anionic or cationic surfactant having a weak catalysis can be carried out in the same manner as in the above embodiment.

With respect to the formulation in these embodiments, it is preferred that the organopolysiloxane mixture of components (A) and (B) account for 10 to 80% by weight of the emulsion, and component (C) account for 0.1 to 10% by weight of the emulsion, the balance being water. If the organopolysiloxane mixture is less than 10 wt %, the emulsion may become less stable. If the organopolysiloxane mixture is more than 80 wt %, the emulsion may become too viscous, losing production efficiency. Therefore, the content of the organopolysiloxane mixture is preferably 10 to 80 wt %, and more preferably 30 to 60 wt %. If component (C) is less than 0.1 wt %, the polymerization rate may become low. More than 10 wt % of component (C) may adversely affect the properties of the resulting organopolysiloxane. The more preferred content of component (C) is 0.5 to 5 wt %. The balance is water. The proportion of components (A) and (B) in the organopolysiloxane mixture is as previously described.

In order to improve the stability of the branched organopolysiloxane emulsion polymer resulting from the above-described emulsion polymerization procedure according to the invention, another anionic, nonionic, cationic or ampholytic surfactant may be added at the end of emulsion polymerization or at the end of neutralization insofar as the objects of the invention are not impaired. Such anionic surfactants are, for example, higher alcohol sulfuric ester salts, alkyl phenyl ether sulfuric ester salts, alkylbenzenesulfonic acid salts, higher alcohol phosphoric ester salts, ethoxylated higher alcohol sulfuric ester salts, ethoxylated alkyl phenyl ether sulfuric ester salts, and ethoxylated higher alcohol phosphoric salts. Exemplary nonionic surfactants include ethoxylated higher alcohols, ethoxylated alkyl phenols, polyhydric alcohol fatty acid esters, ethoxylated polyhydric alcohol fatty acid esters, ethoxylated fatty acids, ethoxylated fatty acid amides, sorbitol, sorbitan fatty acid esters, ethoxylated sorbitan fatty acid esters, and sucrose fatty acid esters. Exemplary cationic surfactants include amine salts such as alkylamine salts, polyamine and aminoalcohol fatty acid derivatives, alkyl quaternary ammonium salts, aromatic quaternary ammonium salts, pyridinium salts, and imidazolium salts. Exemplary ampholytic surfactants include betaines, aminocarboxylic salts, and imidazoline derivatives.

The above-described methods are successful in producing the desired branched organopolysiloxane and branched organopolysiloxane emulsion polymer within a shortened polymerization time.

The method for preparing a branched organopolysiloxane emulsion according to the second aspect to the invention uses components (D), (E) and (C) and water.

Component (D)

One starting reactant (D) used herein is an organopolysiloxane containing branch structure units, specifically an organopolysiloxane containing up to 5% by weight of cyclic low molecular weight siloxanes having up to 10 silicon atoms, represented by the following general formula (2).

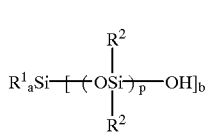

(2)

Herein $R^1$ is a monovalent organic group of 1 to 20 carbon atoms, $R^2$ is independently a monovalent organic group of 1 to 20 carbon atoms, and p is an integer of 4 to 100.

The monovalent organic groups represented by $R^1$ include alkyl groups such as methyl, ethyl, propyl, butyl, pentyl, hexyl, heptyl, octyl, nonyl, decyl, dodecyl, tetradecyl, hexadecyl, octadecyl, and eicosyl, cycloalkyl groups such as cyclopentyl and cyclohexyl, alkenyl groups such as vinyl and allyl, aryl groups such as phenyl, tolyl and naphthyl, alkoxy groups such as methoxy, ethoxy, propoxy, butoxy, hexyloxy, heptyloxy, octyloxy, decyloxy, and tetradecyloxy, and substituted ones in which some of the hydrogen atoms in these organic group structures are replaced by halogen atoms or organic groups containing a polar group such as amino, acryloxy, methacryloxy, epoxy, mercapto or carboxyl. Of these, methyl, vinyl and phenyl are especially preferred.

$R^2$ stands for one or more monovalent organic groups selected from the same monovalent organic groups as $R^1$. It is preferred that methyl account for at least 90 mol % of the $R^2$ groups.

If the content of cyclic low molecular weight siloxanes having up to 10 silicon atoms is more than 5% by weight in the organopolysiloxane, then a siloxane polymer resulting from polymerization may have a volatile low molecular weight siloxane content of more than 5% by weight. Therefore, an organopolysiloxane whose low molecular weight siloxane content has been adjusted to 5% by weight or less, preferably 4% by weight or less, more preferably 3% by weight or less must be used. If p is less than 4, it becomes difficult to adjust the content of cyclic low molecular weight siloxanes having up to 10 silicon atoms to 5% by weight or less. If p is more than 100, the emulsion becomes unstable. Therefore, p must range from 4 to 100. The branching of siloxane requires that a+b=4, a=0 or 1, and b=3 or 4. From the standpoint of reactivity during condensation reaction, the terminal groups must be hydroxyl groups.

Such a branched siloxane can be synthesized by well-known methods, for example, by effecting dehydrochlorination reaction between a both end hydroxy-blocked dimethylpolysiloxane with a chlorosilane such as trichloromethylsilane, trichlorophenylsilane, trichlorovinylsilane or tetrachlorosilane.

Component (E)

Another starting reactant (E) used herein is a hydroxy-terminated organopolysiloxane containing up to 5% by weight of cyclic low molecular weight siloxanes having up to 10 silicon atoms, represented by the following general formula (3).

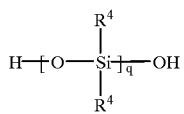

(3)

Herein $R^4$ is a monovalent organic group of 1 to 20 carbon atoms, and q is an integer of 10 to 700.

Examples of the group represented by $R^4$ are the same as described for $R^1$ and $R^2$, with methyl being preferred. If an organopolysiloxane contains more than 5% by weight of cyclic low molecular weight siloxanes having up to 10 silicon atoms, then a siloxane polymer resulting from polymerization may have a volatile low molecular weight siloxane content of more than 5% by weight. Therefore, an organopolysiloxane whose low molecular weight siloxane content has been adjusted to 5% by weight or less, preferably 4% by weight or less, more preferably 3% by weight or less, most preferably 2% by weight or less must be used. If q is less than 10, it becomes difficult to adjust the content of cyclic low molecular weight siloxanes having up to 10 silicon atoms to 5% by weight or less. If q is more than 700, the emulsion becomes unstable. Therefore, q must range from 10 to 700. From the standpoint of reactivity during condensation reaction, the terminal group must be hydroxyl.

Components (D) and (E) may correspond to components (A) and (B), respectively, and therefore the amounts of components (D) and (E) are substantially the same as the amounts of components (A) and (B), respectively. The amount of component (C) is also substantially the same as described above.

The above-described components (D), (E) and (C) are uniformly dispersed and emulsified in water using an emulsifier such as a homomixer or homogenizer. While the emulsion is kept at a temperature of 0 to 30° C., and an acidic substance such as sulfuric acid or hydrochloric acid or a basic substance such as potassium hydroxide or sodium hydroxide is added as a catalyst, if necessary, polymerization reaction is effected for about 5 to 200 hours. Within 5 hours, polycondensation reaction will not proceed to a full extent. A time of more than 200 hours is uneconomical because further polycondensation no longer increases the degree of polymerization. Therefore, the polymerization time is preferably about 5 to 200 hours, and more preferably 10 to 100 hours. Where an acid type surfactant such as alkylbenzenesulfonic acid is used as the surfactant (C), no extra catalyst need be added because the surfactant itself also serves as a catalyst. If the emulsion temperature exceeds 30° C. during polymerization, preferential equilibration reaction can take place to form a low molecular weight siloxane by-product. Then the emulsion is preferably kept at a temperature below 30° C. in order that condensation reaction between silanols become preferential. Below 0° C., the emulsion becomes unstable because of freezing. Therefore, the temperature is preferably in the range of 0 to 30° C., more preferably 0 to 25° C., and further preferably 0 to 20° C. After the completion of polymerization, the emulsion is neutralized with a basic substance such as sodium carbonate, ammonia, sodium hydroxide or triethanol amine where the acidic catalyst is used, and with an acidic substance such as acetic acid, formic acid, phosphoric acid or hydrochloric acid where the basic catalyst is used.

The above polymerization procedure yields a branched organopolysiloxane emulsion. The branched organopolysiloxane is represented by the following general formula (14) and contains up to 5% by weight of cyclic low molecular weight siloxanes having up to 10 silicon atoms.

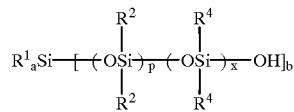

(14)

Herein $R^1$, $R^2$, $R^4$, a, b and p are as defined above, and x is a positive number, and especially from 10 to 4,000.

The branched organopolysiloxane emulsion is useful as a coating composition. For example, a film reinforcing agent, contact modifier, catalyst and the like are blended in the emulsion to formulate an emulsion composition, from which a rubber coating is readily formed simply by removing water.

The above-described method ensures that a branched organopolysiloxane emulsion having a minimized content of low molecular weight siloxane is efficiently produced.

EXAMPLE

Examples of the invention are given below by way of illustration and not by way of limitation. The viscosity is a measurement (centipoise) at 25° C.

Preparation Example 1

Synthesis of siloxane (A-1)

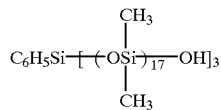
(A-1)

A 1000-ml glass flask equipped with a reflux condenser, thermometer, dropping funnel and stirring blade was charged with 450 g of toluene which had been azeotropically dehydrated and 115.1 g (0.09 mol) of an organopolysiloxane (a-1) of the following average structural formula.

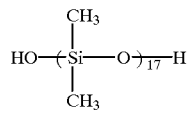
(a-1)

Then 7.8 g (0.099 mol) of pyridine was added to the contents, followed by uniform mixing. At room temperature, 6.35 g (0.03 mol) of phenyltrichlorosilane was added dropwise over 10 minutes. During the step, formation of a white pyridine hydrochloride salt was observed and the flask temperature rose to 35° C. After the completion of dropwise addition, the solution was stirred for one hour, then heated at 80° C. and stirred for a further one hour. After cooling, the pyridine hydrochloride salt was filtered off, and the filtrate was washed twice with a 5% aqueous solution of sodium sulfate. The pyridine hydrochloride salt had a dry weight of 10.7 g (theoretical weight 10.4 g), which confirmed the substantially quantitative progress of reaction.

The filtrate was dried over sodium sulfate anhydride for one day. After the sodium sulfate anhydride was filtered off, the toluene was removed by stripping, yielding 108 g of a colorless liquid having a viscosity of 115 cp.

Upon identification by $^{28}$Si—NMR, the liquid was found to have the structural formula of (A-1).

Preparation Example 2

Synthesis of siloxane (A-2)

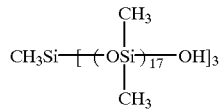
(A-2)

Synthesis was carried out as in Preparation Example 1 except that 4.5 g (0.03 mol) of methyltrichlorosilane was used instead of the phenyltrichlorosilane. There was obtained 104 g of a colorless liquid having a viscosity of 102 cp. Upon identification by $^{28}$Si—NMR, the liquid was found to have the structural formula of (A-2).

Preparation Example 3

Synthesis of siloxane (A-3)

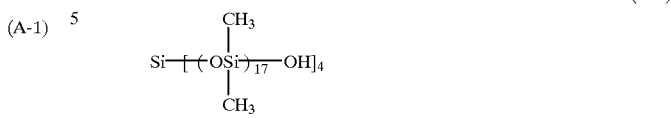
(A-3)

Synthesis was carried out as in Preparation Example 1 except that 3.83 g (0.0225 mol) of tetrachlorosilane was used instead of the phenyltrichlorosilane. There was obtained 101 g of a colorless liquid having a viscosity of 107 cp. Upon identification by $^{28}$Si—NMR, the liquid was found to have the structural formula of (A-3).

Example 1

To a mixture of 31.4 g of siloxane (A-1) synthesized in Preparation Example 1 and 470.4 g of octamethylcyclotetrasiloxane were added 50 g of a 10% aqueous solution of sodium dodecylbenzenesulfonate and 50 g of deionized water. The mixture was agitated by a homomixer at 1,000 rpm to effect phase inversion emulsification and further agitated at 5,000 rpm for 15 minutes. Then 50 g of a 10% aqueous solution of dodecylbenzenesulfonic acid was added and 333.1 g of deionized water was added for dilution. This dilution was passed twice through Nanomizer LA-31 (Nanomizer K. K.) under a pressure of 1,000 kgf/cm$^2$, for dispersion and emulsification. The emulsion was held for 6 hours at 50° C. for polymerization to take place and then ripened for 10 hours at 15° C. Then 9.8 g of a 10% aqueous solution of sodium carbonate was added for neutralization to pH 6.2, obtaining a uniform emulsion having a mean particle size of 185 nm, designated Emulsion-1. By adding 90 g of isopropyl alcohol to 10 g of Emulsion-1, the oil component was extracted therefrom. After the oil component was dried at 105° C. for 3 hours, a 5% toluene solution of the oil component was measured for viscosity using a rotational vibrating viscometer Viscomate VM-1G (Yamaichi Denki K. K.). The results are shown in Table 1.

Comparative Example 1

The procedure of Example 1 was repeated except that there were used 1.8 g of phenyltriethoxysilane instead of (A-1) and 500 g of octamethylcyclotetrasiloxane, obtaining an emulsion having a mean particle size of 198 nm, designated Emulsion-2. For this Emulsion-2, as in Example 1, the oil component was extracted and a 5% toluene solution of the dry oil component was measured for viscosity. The results are shown in Table 2.

Example 2

The procedure of Example 1 was repeated except that polymerization was effected for 20 hours at 25° C. and ripening was omitted, obtaining a uniform emulsion having a mean particle size of 190 nm, designated Emulsion-3. For this Emulsion-3, as in Example 1, the oil component was extracted and a 5% toluene solution of the dry oil component was measured for viscosity. The results are shown in Table 1.

Comparative Example 2

The procedure of Example 2 was repeated except that there were used 1.8 g of phenyltriethoxysilane instead of (A-1) and 500 g of octamethylcyclotetrasiloxane, obtaining a uniform emulsion having a mean particle size of 210 nm, designated Emulsion-4. For this Emulsion-4, the oil component was extracted and dried as in Example 1, but the oil component volatilized off, indicating the restrained progress of polymerization. The results are shown in Table 2.

Example 3

The procedure of Example 1 was repeated except that (A-2) was used instead of (A-1), a homogenizer model 15M-8TA (APV Gaulin Co.) was used under a pressure of 200 kgf/cm$^2$ instead of Nanomizer LA-31, and polymerization was effected for 20 hours at 50° C. There was obtained a uniform emulsion having a mean particle size of 402 nm, designated Emulsion-5. For this Emulsion-5, as in Example 1, the oil component was extracted and a 5% toluene solution of the dry oil component was measured for viscosity. The results are shown in Table 1.

Comparative Example 3

The procedure of Example 3 was repeated except that there were used 1.0 g of methyltrimethoxysilane instead of (A-2) and 500.8 g of octamethylcyclotetrasiloxane, obtaining a uniform emulsion having a mean particle size of 412 nm, designated Emulsion-6. For this Emulsion-6, as in Example 1, the oil component was extracted and a 5% toluene solution of the dry oil component was measured for viscosity. The results are shown in Table 2.

Example 4

To a mixture of 31.4 g of siloxane (A-2) synthesized in Preparation Example 2 and 470.4 g of octamethylcyclotetrasiloxane were added 50 g of a 40% aqueous solution of benzyldimethyldodecylammonium hydroxide and 40 g of deionized water. The mixture was agitated by a homomixer at 1,000 rpm to effect phase inversion emulsification and further agitated at 5,000 rpm for 15 minutes. Then 383.1 g of deionized water was added for dilution. This dilution was passed twice through Nanomizer LA-31 (Nanomizer K. K.) under a pressure of 1,000 kgf/cm$^2$, for dispersion and emulsification. The emulsion was held for 20 hours at 50° C. for polymerization to take place and then ripened for 24 hours at 15° C. Then 46 g of 5% hydrochloric acid was added for neutralization to pH 6.8, obtaining a uniform emulsion having a mean particle size of 129 nm, designated Emulsion-7. For this Emulsion-7, as in Example 1, the oil component was extracted and a 5% toluene solution of the dry oil component was measured for viscosity. The results are shown in Table 1.

Comparative Example 4

The procedure of Example 4 was repeated except that there were used 1.0 g of methyltrimethoxysilane instead of (A-2) and 500.8 g of octamethylcyclotetrasiloxane, obtaining a uniform emulsion having a mean particle size of 132 nm, designated Emulsion-8. For this Emulsion-8, as in Example 1, the oil component was extracted and a 5% toluene solution of the dry oil component was measured for viscosity. The results are shown in Table 2.

Example 5

The procedure of Example 1 was repeated except that there were used 20.5 g of (A-3) synthesized in Preparation Example 3 instead of (A-1) and 479.5 g of octamethylcyclotetrasiloxane, obtaining a uniform emulsion having a mean particle size of 190 nm, designated Emulsion-9. For this Emulsion-9, as in Example 1, the oil component was extracted and a 5% toluene solution of the dry oil component was measured for viscosity. The results are shown in Table 1.

Comparative Example 5

The procedure of Example 1 was repeated except that there were used 0.82 g of tetraethoxysilane instead of (A-1) and 500 g of octamethylcyclotetrasiloxane, obtaining a uniform emulsion having a mean particle size of 185 nm, designated Emulsion-10. For this Emulsion-10, as in Example 1, the oil component was extracted and a 5% toluene solution of the dry oil component was measured for viscosity. The results are shown in Table 2.

TABLE 1

| Emulsion No. | E1 Emulsion 1 | E2 Emulsion 3 | E3 Emulsion 5 | E4 Emulsion 7 | E5 Emulsion 9 |
|---|---|---|---|---|---|
| Formulation | | | | | |
| (A-1) | 31.4 | 31.4 | 0 | 0 | 0 |
| (A-2) | 0 | 0 | 31.4 | 31.4 | 0 |
| (A-3) | 0 | 0 | 0 | 0 | 20.5 |
| Phenyltriethoxysilane | 0 | 0 | 0 | 0 | 0 |
| Methyltrimethoxysilane | 0 | 0 | 0 | 0 | 0 |
| Tetraethoxysilane | 0 | 0 | 0 | 0 | 0 |
| Octamethylcyclotetrasiloxane | 470.4 | 470.4 | 470.4 | 470.4 | 479.5 |
| 10% sodium dodecylbenzenesulfonate solution | 50 | 50 | 50 | 0 | 50 |
| 10% dodecylbenzenesulfonic acid solution | 50 | 50 | 50 | 0 | 50 |
| 40% benzyldimethyldodecylammonium hydroxide solution | 0 | 0 | 0 | 50 | 0 |
| Phase inverting water | 50 | 50 | 50 | 40 | 50 |
| Diluting water | 333.1 | 333.1 | 333.1 | 391.1 | 333.1 |
| Preparation conditions | | | | | |
| Emulsifying pressure (kgf/cm$^2$) | 1000 | 1000 | 200 | 1000 | 1000 |
| Polymerization time at 50° C. (hr) | 6 | 0 | 20 | 20 | 6 |
| Polymerization time at 25° C. (hr) | 0 | 20 | 0 | 0 | 0 |
| Ripening time at 15° C. (hr) | 10 | 0 | 10 | 24 | 10 |
| Physical properties | | | | | |
| Mean particle size (nm) | 185 | 190 | 402 | 129 | 190 |
| 5% extract viscosity (cp) | 20 | 15 | 17 | 18 | 23 |

TABLE 2

| Emulsion No. | CE1 Emulsion 2 | CE2 Emulsion 4 | CE3 Emulsion 6 | CE4 Emulsion 8 | CE5 Emulsion 10 |
|---|---|---|---|---|---|
| Formulation | | | | | |
| (A-1) | 0 | 0 | 0 | 0 | 0 |
| (A-2) | 0 | 0 | 0 | 0 | 0 |
| (A-3) | 0 | 0 | 0 | 0 | 0 |
| Phenyltriethoxysilane | 1.8 | 1.8 | 0 | 0 | 0 |
| Methyltrimethoxysilane | 0 | 0 | 1.0 | 1.0 | 0 |
| Tetraethoxysilane | 0 | 0 | 0 | 0 | 0.82 |
| Octamethylcyclotetrasiloxane | 500.0 | 500.0 | 500.8 | 500.8 | 500.0 |

TABLE 2-continued

| Emulsion No. | CE1 Emulsion 2 | CE2 Emulsion 4 | CE3 Emulsion 6 | CE4 Emulsion 8 | CE5 Emulsion 10 |
|---|---|---|---|---|---|
| 10% sodium dodecylbenzenesulfonate solution | 50 | 50 | 50 | 0 | 50 |
| 10% dodecylbenzenesulfonic acid solution | 50 | 50 | 50 | 0 | 50 |
| 40% benzyldimethyl-dodecylammonium hydroxide solution | 0 | 0 | 0 | 50 | 0 |
| Phase inverting water | 50 | 50 | 50 | 40 | 50 |
| Diluting water | 333.1 | 333.1 | 333.1 | 391.1 | 333.1 |
| Preparation conditions | | | | | |
| Emulsifying pressure (kgf/cm$^2$) | 1000 | 1000 | 200 | 1000 | 1000 |
| Polymerization time at 50° C. (hr) | 6 | 0 | 20 | 20 | 6 |
| Polymerization time at 25° C. (hr) | 0 | 20 | 0 | 0 | 0 |
| Ripening time at 15° C. (hr) | 10 | 0 | 10 | 24 | 10 |
| Physical properties | | | | | |
| Mean particle size (nm) | 198 | 210 | 412 | 132 | 185 |
| 5% extract viscosity (cp) | 4 | UM | 5 | 5 | 5 |

UM: unmeasurable

Example 6

A 2-liter polyethylene beaker was charged with 24.4 g of a branch unit-containing organopolysiloxane containing 2.8 wt % of cyclic low molecular weight siloxanes of up to 10 silicon atoms, represented by the following formula (i), 415.6 g of a hydroxy-terminated organopolysiloxane containing 1.3 wt % of cyclic low molecular weight siloxanes of up to 10 silicon atoms, represented by the following formula (ii), and 100 g of a 10% aqueous solution of sodium laurylsulfate.

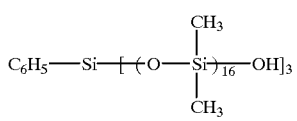
(i)

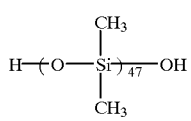
(ii)

The contents were uniformly emulsified by a homomixer, and 366 g of water was slowly added for dilution. This dilution was passed twice through a high-pressure homogenizer under a pressure of 29.4 MPa, obtaining a uniform white emulsion. The emulsion was cooled at 5° C., 50 g of a 10% aqueous solution of dodecylbenzenesulfonic acid added, and polymerization reaction effected for 70 hours. The emulsion was then neutralized with 11 g of 3% aqueous ammonia to pH 8, obtaining Emulsion A. This emulsion had a non-volatile content of 44.5% by weight when dried at 105° C. for 3 hours. Physical properties are shown in Table 3.

Example 7

Emulsion B was obtained by the same procedure as Example 6 except that there were used 24 g of a branch unit-containing organopolysiloxane containing 2.6 wt % of cyclic low molecular weight siloxanes of up to 10 silicon atoms, represented by the following formula (iii) and 416 g of the hydroxy-terminated organopolysiloxane containing 1.3 wt % of cyclic low molecular weight siloxanes of up to 10 silicon atoms, represented by the formula (ii).

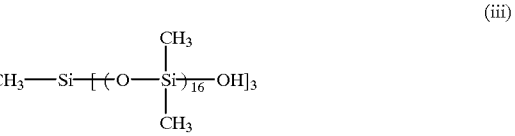
(iii)

This emulsion B had a non-volatile content of 44.6% by weight when dried at 105° C. for 3 hours. Physical properties are shown in Table 3.

Example 8

Emulsion C was obtained by the same procedure as Example 6 except that there were used 24.1 g of a branch unit-containing organopolysiloxane containing 3.0 wt % of cyclic low molecular weight siloxanes of up to 10 silicon atoms, represented by the following formula (iv) and 415.9 g of the hydroxy-terminated organopolysiloxane containing 1.3 wt % of cyclic low molecular weight siloxanes of up to 10 silicon atoms, represented by the formula (ii).

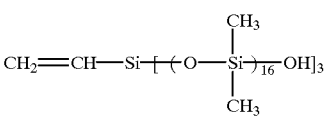
(iv)

This emulsion C had a non-volatile content of 44.5% by weight when dried at 105° C. for 3 hours. Physical properties are shown in Table 3.

Example 9

Emulsion D was obtained by the same procedure as Example 6 except that the emulsion was kept at 20° C. during polymerization. This emulsion D had a non-volatile content of 43.6% by weight when dried at 105° C. for 3 hours. Physical properties are shown in Table 3.

Comparative Example 6

Emulsion E was obtained by the same procedure as Example 6 except that there were used 1.6 g of a trifunctional alkoxysilane represented by $C_6H_5Si(OC_2H_5)_3$ and 438.4 g of the hydroxy-terminated organopolysiloxane containing 1.3 wt % of cyclic low molecular weight siloxanes of up to 10 silicon atoms, represented by the formula (ii). This emulsion F had a non-volatile content of 44.4% by weight when dried at 105° C. for 3 hours. Physical properties are shown in Table 3.

Comparative Example 7

Emulsion F was obtained by the same procedure as Comparative Example 8 except that there were used 1.6 g of a trifunctional alkoxysilane represented by $C_6H_5Si(OC_2H_5)_3$ and 438.4 g of octamethylcyclotetrasiloxane. This emulsion H had a non-volatile content of 40.0% by weight when dried at 105° C. for 3 hours. Physical properties are shown in Table 3.

Coating compositions were prepared by blending the above-prepared Emulsions A to F with the following ingredients according to a known formulation. A dry coating of each coating composition was measured for rubber elasticity. The results are shown in Table 3.

| Formulation | Parts by weight |
| --- | --- |
| Emulsion A to F | 100 |
| Film reinforcing agent | 30 |
| Contact modifier No. 1 | 5 |
| Contact modifier No. 2 | 2 |
| Condensation catalyst | 1 |

The film reinforcing agent is a 20% slurry of colloidal silica. The condensation catalyst is a 30% emulsion of dioctyltin dilaurate. Contact modifier No. 1 is the reaction product of maleic anhydride and $(C_2H_5O)_3SiC_3H_6NH_2$. Contact modifier No. 2 is shown below.

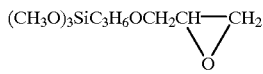

Rubber Elasticity Measurement

The coating composition, 20 g, was placed in a tray of 125 mm×80 mm, air dried at room temperature for 2 days, and heated at 105° C. for one hour for curing. The cured rubber sheet was measured for elongation according to JIS K-6249. For use as a coating composition, the desired level of elongation is 250% or greater.

TABLE 3

| Example | Emulsion | Low molecular weight siloxane content (wt %) | Viscosity of 5% toluene solution (mPa · s) | Rubber sheet Elongation (%) |
| --- | --- | --- | --- | --- |
| E6 | A | 1.8 | 48 | 300 |
| E7 | B | 1.9 | 59 | 330 |
| E8 | C | 1.8 | 63 | 350 |
| E9 | D | 4.1 | 38 | 270 |
| CE6 | E | 2.1 | 15 | 50 |
| CE7 | F | 12.1 | 44 | 320 |

The content of low molecular weight siloxanes was determined by adding 10 ml of water, 10 ml of methanol and 20 ml of n-hexane to 1 ml of the emulsion, and shaking the mixture whereby the siloxanes were extracted in the hexane phase. The hexane phase was analyzed by gas chromatography. The content of low molecular weight siloxanes is expressed in % by weight based on the weight of the entire siloxanes.

The viscosity of a 5% toluene solution was determined by adding 5 ml of the emulsion to 50 ml of isopropyl alcohol with stirring, separating the siloxanes, drying the siloxanes at 105° C. for one hour, dissolving the dry siloxanes in toluene to a concentration of 5% by weight, and measuring the viscosity of the toluene solution by an Ostwald viscometer.

Japanese Patent Application Nos. 11-256024 and 11-276501 are incorporated herein by reference.

Reasonable modifications and variations are possible from the foregoing disclosure without departing from either the spirit or scope of the present invention as defined by the claims.

What is claimed is:

1. A method for preparing a branched organopolysiloxane, comprising the step of polymerizing an organopolysiloxane mixture of (A) an organopolysiloxane and (B) a low molecular weight organopolysiloxane in the presence of an acidic or basic catalyst, said organopolysiloxane (A) being of the following general formula (1):

(1)

wherein $R^1$ is a monovalent organic group of 1 to 20 carbon atoms, $R^2$ is independently a monovalent organic group of 1 to 20 carbon atoms, $R^3$ is a hydroxyl group, alkoxy group of 1 to 6 carbon atoms or monovalent organic group of 1 to 20 carbon atoms, m is a number from 1 to 100, "a" is equal to 0 or 1, "b" is equal to 3 or 4, and a+b is equal to 4.

2. A method for preparing a branched organopolysiloxane, comprising the steps of:

adding (C) an acidic or basic surfactant to an organopolysiloxane mixture of (A) an organopolysiloxane and (B) a low molecular weight organopolysiloxane, said organopolysiloxane (A) being of the following general formula (1):

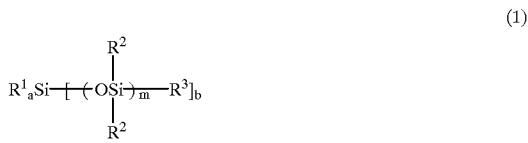

(1)

wherein $R^1$ is a monovalent organic group of 1 to 20 carbon atoms, $R^2$ is independently a monovalent organic group of 1 to 20 carbon atoms, $R^3$ is a hydroxyl group, alkoxy group of 1 to 6 carbon atoms or monovalent organic group of 1 to 20 carbon atoms, m is a number from 1 to 100, "a" is equal to 0 or 1, "b" is equal to 3 or 4, and a+b is equal to 4;

dispersing the organopolysiloxane mixture in water with the aid of the surfactant to form an emulsion, and polymerizing the organopolysiloxane mixture in the emulsion.

3. The method of claim 1 wherein the low molecular weight organopolysiloxane (B) is a cyclic organopolysiloxane or a chain organopolysiloxane end-blocked with a triorganosilyl, diorganomonohydroxysilyl or diorganomonoalkoxysilyl group or a mixture thereof.

4. A method for preparing a branched organopolysiloxane, comprising the step of polymerizing an organopolysiloxane mixture in the presence of an acidic or basic catalyst, said organopolysiloxane mixture comprising, (D) an organopolysiloxane of the following general formula (2):

(2)

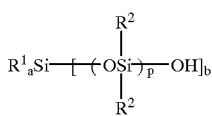

wherein $R^1$ is a monovalent organic group of 1 to 20 carbon atoms, $R^2$ is independently a monovalent organic group of 1 to 20 carbon atoms, p is an integer of 4 to 100, "a" is equal to 0 or 1, "b" is equal to 3 or 4, and a+b is equal to 4, said organopolysiloxane containing up to 5% by weight of cyclic low molecular weight siloxanes having up to 10 silicon atoms, (E) a hydroxy-terminated organopolysiloxane of the following general formula (3):

(3)

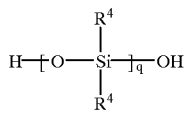

wherein $R^4$ is a monovalent organic group of 1 to 20 carbon atoms, and q is an integer of 10 to 700, said organopolysiloxane containing up to 5% by weight of cyclic low molecular weight siloxanes having up to 10 silicon atoms, the resulting branched organopolysiloxane containing up to 5% by weight of cyclic low molecular weight siloxanes having up to 10 silicon atoms.

5. A method for preparing a branched organopolysiloxane, comprising the steps of:

adding (C) an acidic or basic surfactant to an organopolysiloxane mixture of (D) an organopolysiloxane of the following general formula (2):

(2)

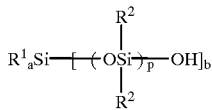

wherein $R^1$ is a monovalent organic group of 1 to 20 carbon atoms, $R^2$ is independently a monovalent organic group of 1 to 20 carbon atoms, p is an integer of 4 to 100, "a" is equal to 0 or 1, "b" is equal to 3 or 4, and a+b is equal to 4, the organopolysiloxane containing up to 5% by weight of cyclic low molecular weight siloxanes having up to 10 silicon atoms, and (E) a hydroxy-terminated organopolysiloxane of the following general formula (3):

(3)

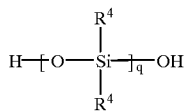

wherein $R^4$ is a monovalent organic group of 1 to 20 carbon atoms, and q is an integer of 10 to 700, the organopolysiloxane containing up to 5% by weight of cyclic low molecular weight siloxanes having up to 10 silicon atoms, dispersing the organopolysiloxane mixture in water with the aid of the surfactant to form an emulsion, and polymerizing the organopolysiloxane mixture in the emulsion, the resulting branched organopolysiloxane containing up to 5% by weight of cyclic low molecular weight siloxanes having up to 10 silicon atoms.

6. The method of claim 2, wherein the low molecular weight organopolysiloxane (B) is a cyclic organopolysiloxane or a chain organopolysiloxane end-blocked with a triorganosilyl, diorganomonohydroxysilyl or diorganomonoalkoxysilyl group or a mixture thereof.

7. A method according to claim 1, wherein $R^1$, $R^2$, and $R^3$ when it is a monovalent organic group of 1 to 20 carbon atoms, each independently, is an alkyl group, a cycloalkyl group, an alkenyl group, an aryl group or an alkoxy group, each optionally substituted by one or more halogen atoms or organic groups containing a polar group.

8. A method according to claim 1, wherein at least 90 mol % of $R^2$ is methyl.

9. A method according to claim 1, wherein $R^1$, $R^2$ and $R^3$ when it is a monovalent organic group of 1 to 20 carbon atoms, each independently, are methyl, vinyl or phenyl.

10. A method according to claim 1, wherein $R^3$ is hydroxyl.

11. A method according to claim 1, wherein m is 10 to 50.

12. A method according to claim 3, wherein the cyclic organopolysiloxane is a compound of formula (7)

(7)

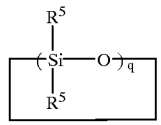

wherein $R^5$ is hydrogen or a monovalent hydrocarbon group of 1 to 8 carbon atoms, and q is an integer of 3 to 8, and wherein the chain organopolysiloxane end-blocked with a triorganosilyl, diorganomonohydroxysilyl or diorganomonoalkoxysilyl group is a compound of formula (8)

(8)

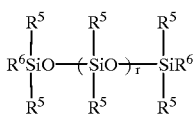

wherein $R^5$ is hydrogen or a monovalent hydrocarbon group of 1 to 8 carbon atoms, $R^6$ is a hydroxyl group, an alkoxy group of 1 to 8 carbon atoms, a hydrogen, or a monovalent hydrocarbon group of 1 to 8 carbon atoms, and r is 0 to 40.

13. A method according to claim 1, wherein the organopolysiloxane mixture of (A) and (B) comprises 0.1 to 50% by weight of (A).

14. A method according to claim 1, wherein the organopolysiloxane mixture of (A) and (B) comprises 1 to 20% by weight of (A).

15. A method according to claim 2, wherein a nonionic surfactant is used in addition to the acidic or basic surfactant.

16. A method according to claim 1, wherein the acidic or basic surfactant is of formulae (9), (10), (11), (12), or (13)

$$R^7C_6H_4SO_3H \qquad (9)$$

$$R^7C_6H_4O\text{-}(CH_2CH_2O)_s\text{-}SO_3H \qquad (10)$$

$$R^8OSO_3H \qquad (11)$$

$$R^8O\text{-}(CH_2CH_2O)_t\text{-}SO_3H \qquad (12)$$

$$R^9R^{10}R^{11}R^{12}NOH \qquad (13)$$

wherein $R^7$, $R^8$ and $R^9$, each independently, is a monovalent aliphatic hydrocarbon group of at least 6 carbon atoms, $R^{10}$, $R^{11}$ and $R^{12}$, each independently, is a monovalent hydrocarbon group of 1 to 8 carbon atoms, and s and t, each independently, is an integer of 1 to 20.

17. A method according to claim 2, wherein the acidic or basic surfactant is an anionic or cationic surfactant having a weak catalysis, further comprising adding an acid or an alkali substance to the organopolysiloxane mixture of (A) and (B).

18. A method according to claim 2, wherein adding (C) to (A) and (B) forms an emulsion, said emulsion comprises water; 10 to 80% by weight of the organopolysiloxane mixture of (A) and (B); and 0.1 to 10% by weight of (C).

19. A method according to claim 4, wherein (D) contains up to 3% by weight of cyclic low molecular weight siloxanes having up to 10 silicon atoms.

20. A method according to claim 4, wherein (E) contains up to 2% by weight of cyclic low molecular weight siloxanes having up to 10 silicon atoms.

* * * * *